United States Patent
Weng et al.

(10) Patent No.: US 10,296,152 B2
(45) Date of Patent: May 21, 2019

(54) TOUCH DISPLAY PANEL

(71) Applicant: HON HAI PRECISION INDUSTRY CO., LTD., New Taipei (TW)

(72) Inventors: Yu-Fu Weng, New Taipei (TW); Chien-Wen Lin, New Taipei (TW); Chia-Lin Liu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 15/674,635

(22) Filed: Aug. 11, 2017

(65) Prior Publication Data

US 2018/0046279 A1  Feb. 15, 2018

Related U.S. Application Data

(60) Provisional application No. 62/374,113, filed on Aug. 12, 2016.

(51) Int. Cl.
| | |
|---|---|
| *G06F 3/041* | (2006.01) |
| *G06F 3/044* | (2006.01) |
| *G02F 1/1333* | (2006.01) |
| *G02F 1/1335* | (2006.01) |
| *G02F 1/1343* | (2006.01) |
| *G02F 1/1368* | (2006.01) |

(52) U.S. Cl.
CPC ............ *G06F 3/044* (2013.01); *G02F 1/1368* (2013.01); *G02F 1/13338* (2013.01); *G02F 1/13439* (2013.01); *G02F 1/133514* (2013.01); *G02F 1/133528* (2013.01); *G02F 1/134336* (2013.01); *G06F 3/0412* (2013.01); *G06F 3/0416* (2013.01); *G06F 2203/04105* (2013.01); *G06F 2203/04112* (2013.01)

(58) Field of Classification Search
CPC ...... G06F 3/044; G06F 3/0412; G06F 3/0416; G02F 1/13338; G02F 1/133514; G02F 1/133528; G02F 1/134336; G02F 1/13439; G02F 1/1368
USPC .................................................. 345/156–184
See application file for complete search history.

(56) References Cited

U.S. PATENT DOCUMENTS

| | | | |
|---|---|---|---|
| 8,692,798 B1 * | 4/2014 | Zhang | G06F 3/042 345/173 |
| 9,360,972 B1 * | 6/2016 | Avery | G06F 3/044 |
| 9,880,676 B1 * | 1/2018 | Mukherjee | G06F 3/044 |
| 9,983,715 B2 * | 5/2018 | Filiz | G06F 3/0414 |
| 2010/0188347 A1 * | 7/2010 | Mizuhashi | G02F 1/13338 345/173 |

(Continued)

FOREIGN PATENT DOCUMENTS

| | | |
|---|---|---|
| CN | 102782626 B | 3/2016 |
| CN | 205427796 U | 8/2016 |

*Primary Examiner* — Prabodh M Dharia
(74) *Attorney, Agent, or Firm* — ScienBiziP, P.C.

(57) ABSTRACT

A touch display device includes a display module and a sensing module on the display module. The sensing module includes a first electrode layer on the display module, a second electrode layer facing the first electrode layer, and a dielectric layer between the first electrode layer and the second electrode layer. The second electrode layer includes a plurality of electrodes. The electrodes functions as electrodes of the touch display device for sensing a touch position. The electrodes, the first electrode layer, and the dielectric layer cooperatively form capacitors for sensing a touch force.

10 Claims, 9 Drawing Sheets

(56) References Cited

U.S. PATENT DOCUMENTS

| | | | |
|---|---|---|---|
| 2012/0113047 A1 | 5/2012 | Hanauer et al. | |
| 2014/0043251 A1* | 2/2014 | Wilson | G06F 3/041 |
| | | | 345/173 |
| 2014/0192490 A1* | 7/2014 | Taylor | G06F 3/041 |
| | | | 361/749 |
| 2015/0331517 A1* | 11/2015 | Filiz | G06F 3/0414 |
| | | | 345/173 |
| 2016/0088133 A1* | 3/2016 | Kim | G06F 1/1643 |
| | | | 345/174 |
| 2017/0060290 A1* | 3/2017 | Chen | G06F 3/044 |
| 2017/0060292 A1* | 3/2017 | Chen | G06F 3/044 |
| 2017/0102809 A1* | 4/2017 | Son | G06F 3/0414 |
| 2017/0255295 A1* | 9/2017 | Tanemura | G06F 3/044 |
| 2018/0150155 A1* | 5/2018 | Nishikawa | G06F 3/044 |

\* cited by examiner

TOUCH DISPLAY PANEL

FIELD

The subject matter herein generally relates to a touch display panel.

BACKGROUND

An on-cell or in-cell type touch screen device can be manufactured by installing a touch device in a display device. Such a touch screen device can be used as an output device for displaying images while being used as an input device for receiving a touch of a user touching a specific area of a displayed image. However, the touch screen device cannot sense the amount of touch force/pressure applied to the touch screen.

BRIEF DESCRIPTION OF THE DRAWINGS

Implementations of the present technology will now be described, by way of example only, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "coupled" is defined as connected, whether directly or indirectly through intervening components, and is not necessarily limited to physical connections. The connection can be such that the objects are permanently connected or releasably connected. The term "comprising" when utilized, means "including, but not necessarily limited to"; it specifically indicates open-ended inclusion or membership in the so-described combination, group, series, and the like.

Figure 1:
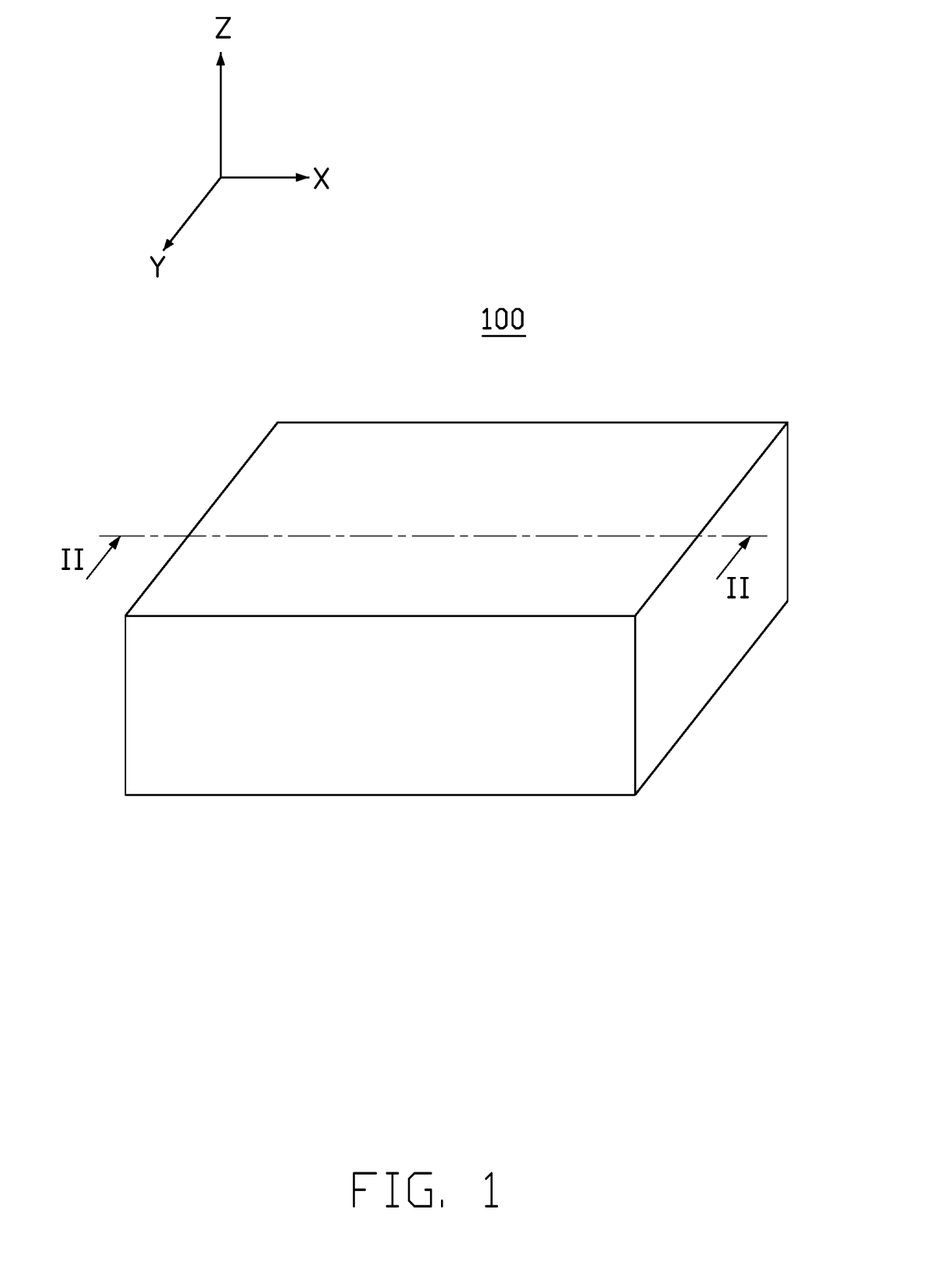
FIG. 1 is an isometric view of an exemplary embodiment of a touch display device.
Figure 2:
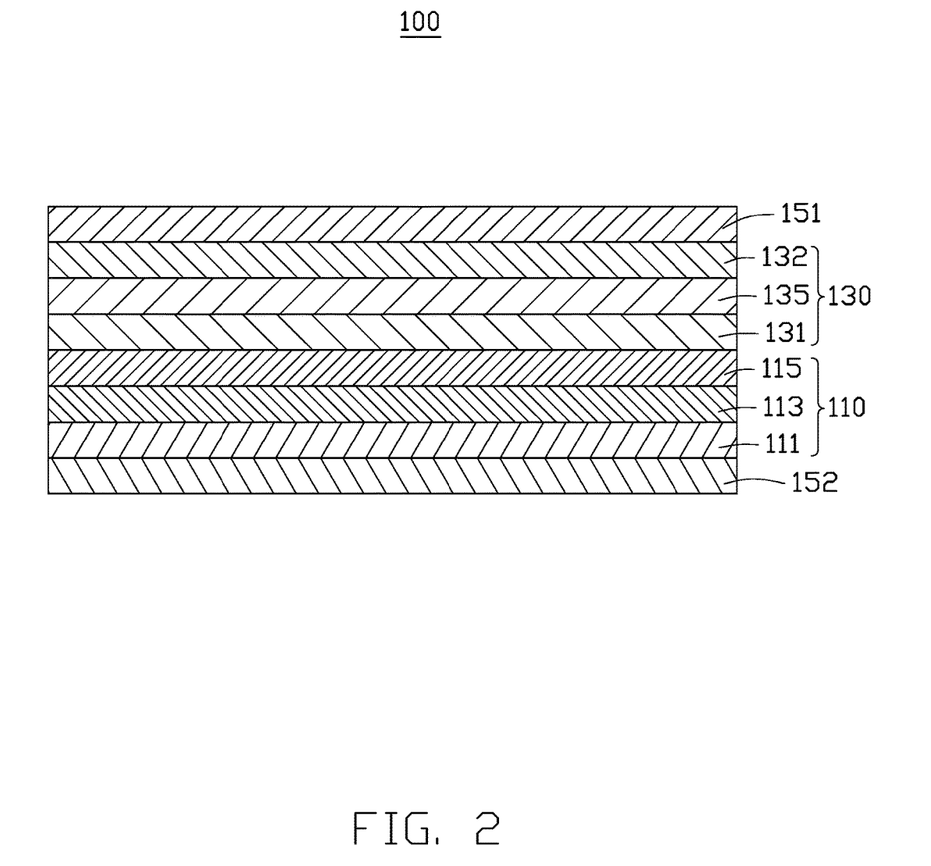
FIG. 2 is a cross-sectional view of the touch display device of FIG. 1 along line II-II.

FIG. 1 and FIG. 2 illustrate a touch display panel 100 according to a first exemplary embodiment.

As shown in FIG. 2, the touch display panel 100 includes a display module 110 and a sensing module 130 stacked on the display module 110. The touch display panel 100 further includes a first polarizer 151 and a second polarizer 152. The first polarizer 151 is on a side of the sensing module 130 away from the display module 110, and the second polarizer 152 is on a side of the display module 110 away from the sensing module 130.

In the exemplary embodiment, the display module 110 is a liquid crystal module. As shown in FIG. 2, the display module 110 includes a thin film transistor (TFT) substrate 111, a color filter substrate 115 facing the TFT substrate 111, and a liquid crystal layer 113 between the TFT substrate 111 and the color filter substrate 115. The TFT substrate 111 includes a substrate (not explicitly shown) and a plurality of thin film transistors (not explicitly shown) on the substrate. The color filter substrate 115 includes a substrate (not explicitly shown) and a color filter layer (not explicitly shown) on the substrate, the color filter layer may includes a plurality of color filter units (not explicitly shown) spaced apart from each and a plurality of black matrixes (not explicitly shown) between any two adjacent color filter units.

It is understood that the touch display panel 100 may further includes a backlight module (not explicitly shown), a plurality of photo spacers between the TFT substrate 111 and the color filter substrate 115, and any other necessary components (not explicitly shown) for a liquid crystal display device.

The sensing module 130 includes a first electrode layer 131, a second electrode layer 132 facing the first electrode layer 131, and a dielectric layer 135 between the first electrode layer 131 and the second electrode layer 132. The first electrode layer 131 is adjacent to the color filter substrate 115, and the second electrode layer 132 is relatively far away from the color filter substrate 115. The dielectric layer 135 is elastic, transparent, and electrically insulative. The dielectric layer 135 may deform when the touch display panel 100 is touched.

The first electrode layer 131, the second electrode layer 132, and the dielectric layer 135 cooperatively form capacitors for sensing touch forces. When a touch force is applied on the touch display device 100, the dielectric layer 135 corresponding to the touch position may deform, and a distance between the first electrode layer 131 and the second electrode layer 132 may vary to vary capacitances of the capacitors. Thus, touch force can be calculated according to capacitance variations of the capacitors.

Figure 3:
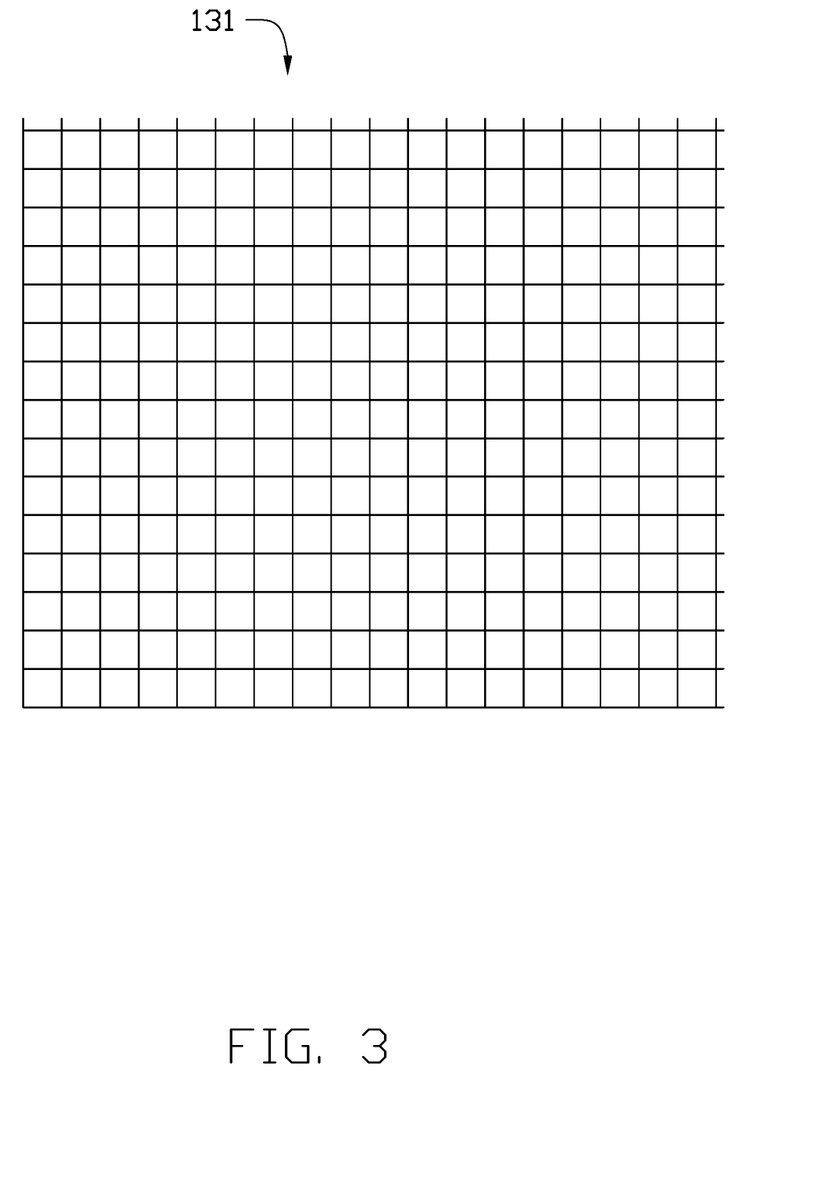
FIG. 3 is a planar view showing a first exemplary embodiment of a first electrode layer of the touch display device of FIG. 2.
Figure 4:
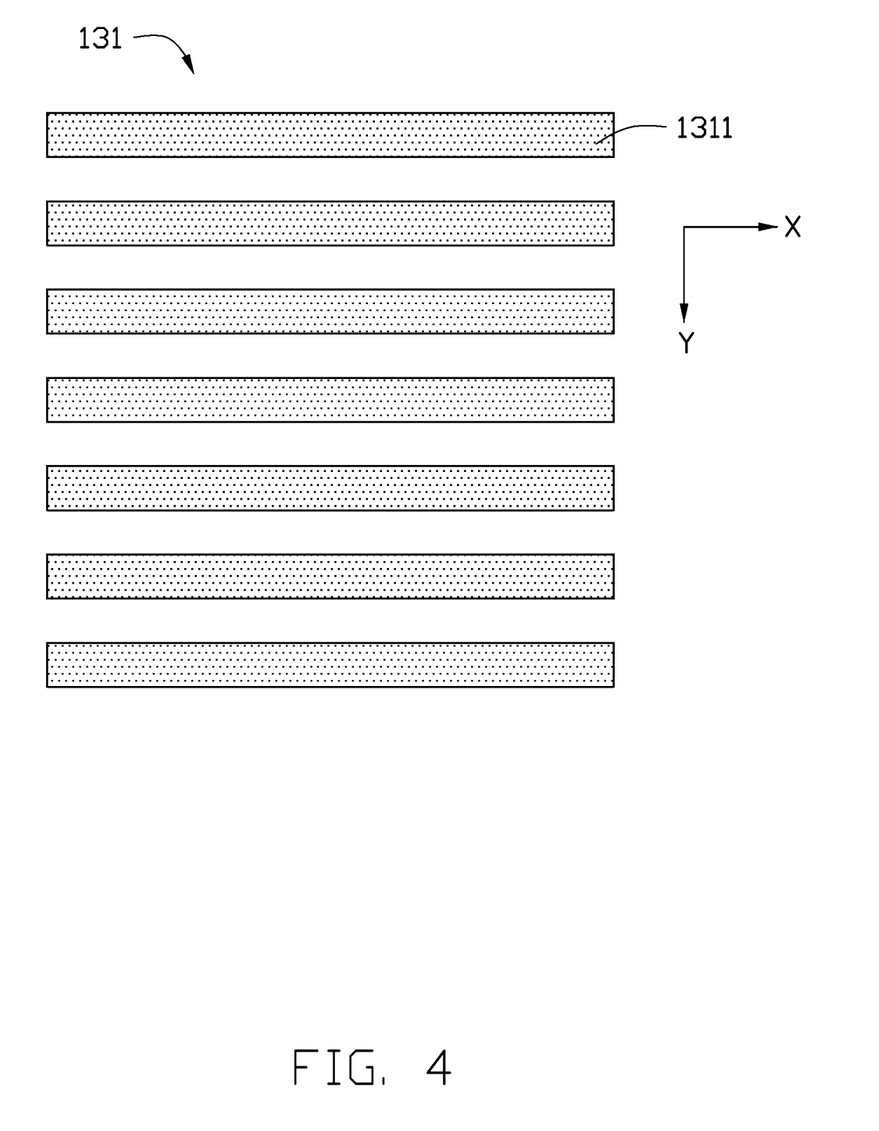
FIG. 4 is a planar view showing a second exemplary embodiment of a first electrode layer of the touch display device of FIG. 2.
Figure 5:
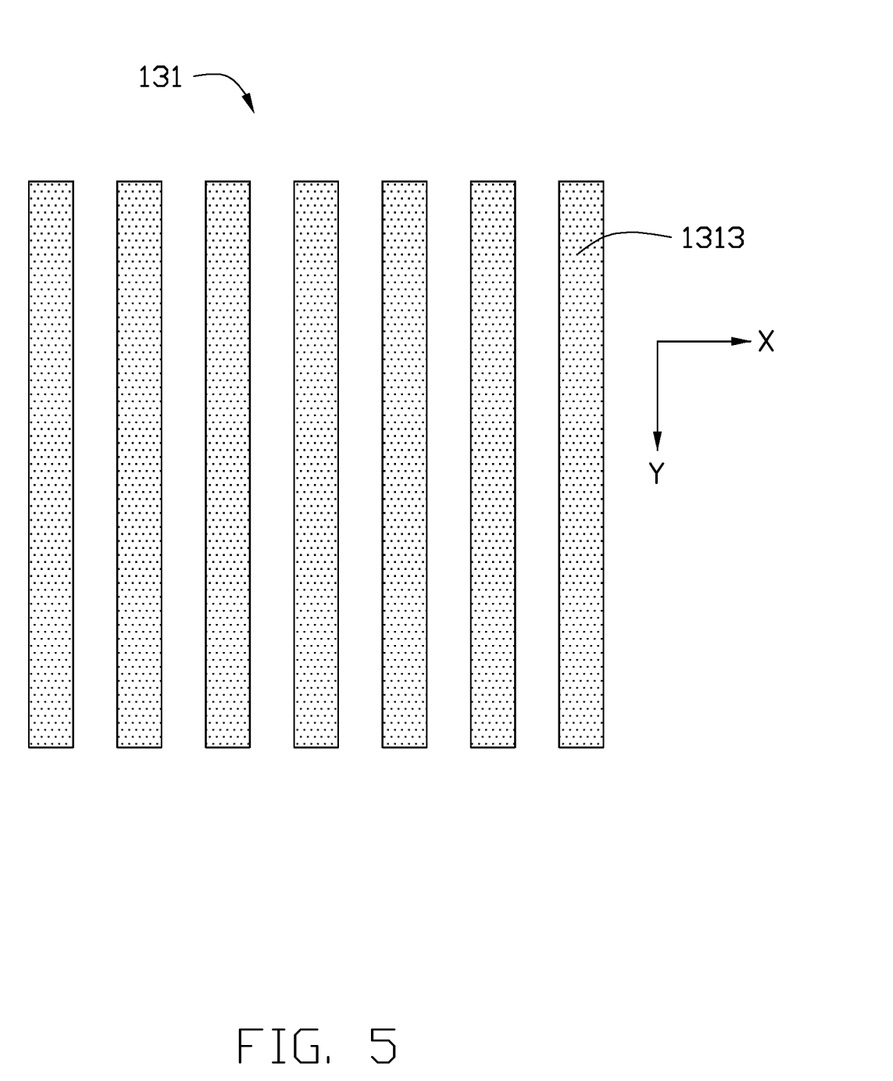
FIG. 5 is a planar view showing a third exemplary embodiment of a first electrode layer of the touch display device of FIG. 2.

The first electrode layer 131 may be a metal mesh as shown in FIG. 3. Alternatively, the first electrode layer 131 may be made of a transparent conductive material, such as indium tin oxide (ITO). As shown in FIG. 4, the first electrode layer 131 includes a plurality of first electrodes 1311; each first electrode 1311 extends as a strip along the X axis direction; and the plurality of first electrodes 1311 are arranged in a row along the Y axis direction. Alternatively, the first electrode layer 131 includes a plurality of first electrodes 1313; each first electrode 1313 extends as a strip along the Y axis direction; and the plurality of first electrodes 1313 are arranged in a row along the X axis direction, as shown in FIG. 5. The first electrode layer 131 shown in FIG. 4 and FIG. 5 may be made of a transparent conductive material.

Figure 6:
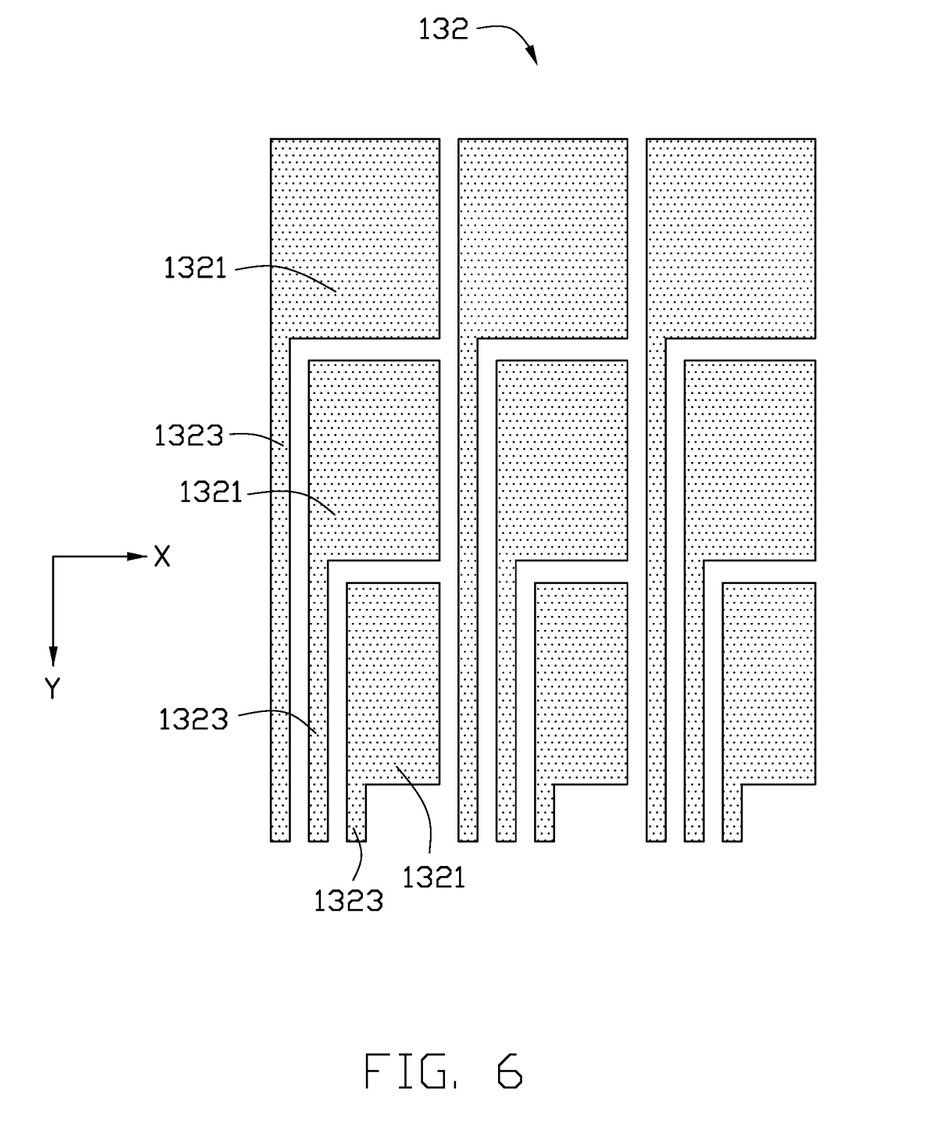
FIG. 6 is a planar view showing a first exemplary embodiment of a second electrode layer of the touch display device of FIG. 2.

The second electrode layer 132 is made of a transparent conductive material, such as indium tin oxide (ITO). FIG. 6 is a planar view showing a first exemplary embodiment of a second electrode layer 132. As shown in FIG. 6, the second electrode layer 132 includes a plurality of second electrodes 1321 spaced apart from each other. The plurality of second electrodes 1321 may also function as self-capacitive sensor for sensing a touch position. The plurality of second electrodes 1321 are arranged in a matrix of rows and columns. Each row of the second electrodes 1321 arranged along the X axis direction; and each column of the second electrodes 1321 arranged along the Y axis direction. When an object (e.g., a finger) is touching on the touch display panel 100, the object as a conductor may affect electrical signals of the second electrodes 1321 corresponding to the touch position, thus the touch position can be detected.

As shown in FIG. 6, each second electrode 1321 is electrically coupled to a trace 1323 so that the second electrode 1321 is electrically coupled to a driving circuit (not explicitly shown). Each trace 1323 is connected to a corner of a corresponding second electrode 1321. The second electrodes 1321 in each row of the second electrodes 1321 may have a same shape and a same area size. The second electrodes 1321 in each column of the second electrodes 1321 have area sizes gradually decrease along the Y axis direction to reserve enough space for the traces 1323, such that all the traces 1323 are parallel to each other, and the traces 1323 of each column of the second electrodes 1321 are at a same side of the column of the second electrodes 1321.

Figure 7:
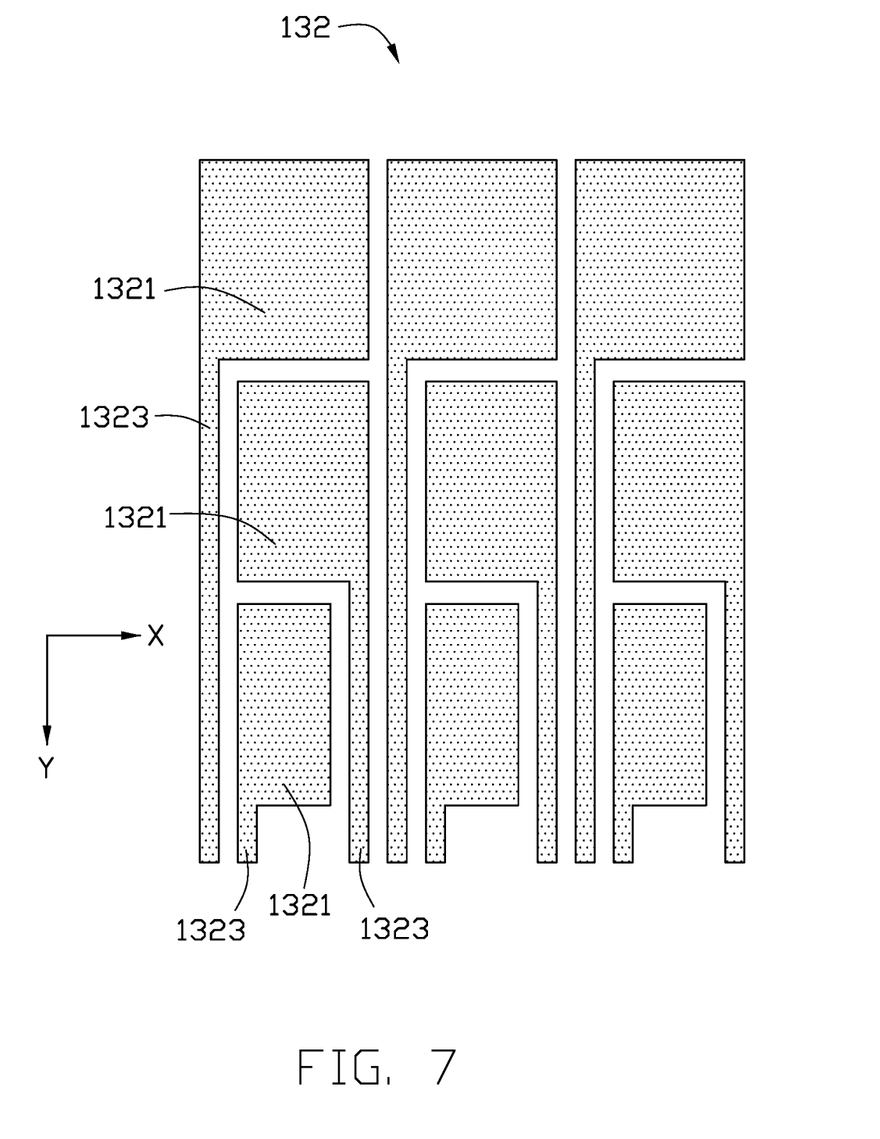
FIG. 7 is a planar view showing a second exemplary embodiment of a second electrode layer of the touch display device of FIG. 2.

FIG. 7 is a planar view showing a second exemplary embodiment of a second electrode layer 132. As shown in FIG. 7, the second electrode layer 132 includes a plurality of second electrodes 1321 spaced apart from each other. The plurality of second electrodes 1321 are arranged in a matrix of rows and columns. Each row of the second electrodes 1321 arranged along the X axis direction; and each column of the second electrodes 1321 arranged along the Y axis direction. As shown in FIG. 7, each second electrode 1321 is electrically coupled to a trace 1323 so that the second electrode 1321 is electrically coupled to a driving circuit (not explicitly shown). Each trace 1323 is connected to a corner of a corresponding second electrode 1321. The second electrodes 1321 in each row of the second electrodes 1321 may have a same shape and a same area size. The second electrodes 1321 in each column of the second electrodes 1321 have area sizes gradually decrease along the Y axis direction to reserve enough space for the traces 1323, such that all the traces 1323 are parallel to each other, and the two traces 1323 of two adjacent second electrodes 1321 in each column of the second electrodes 1321 are at opposite sides of the column of the second electrodes 1321.

Figure 8:
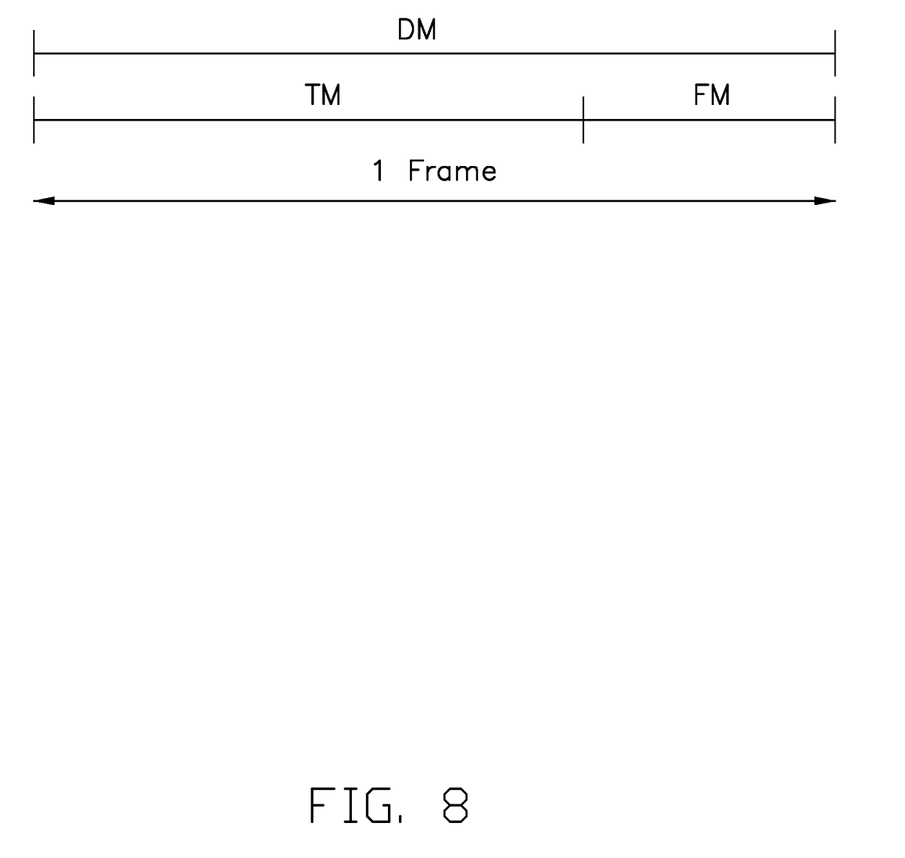
FIG. 8 and FIG. 9 are diagrammatic views of two types of driving time sequence of the touch display device.
Figure 9:
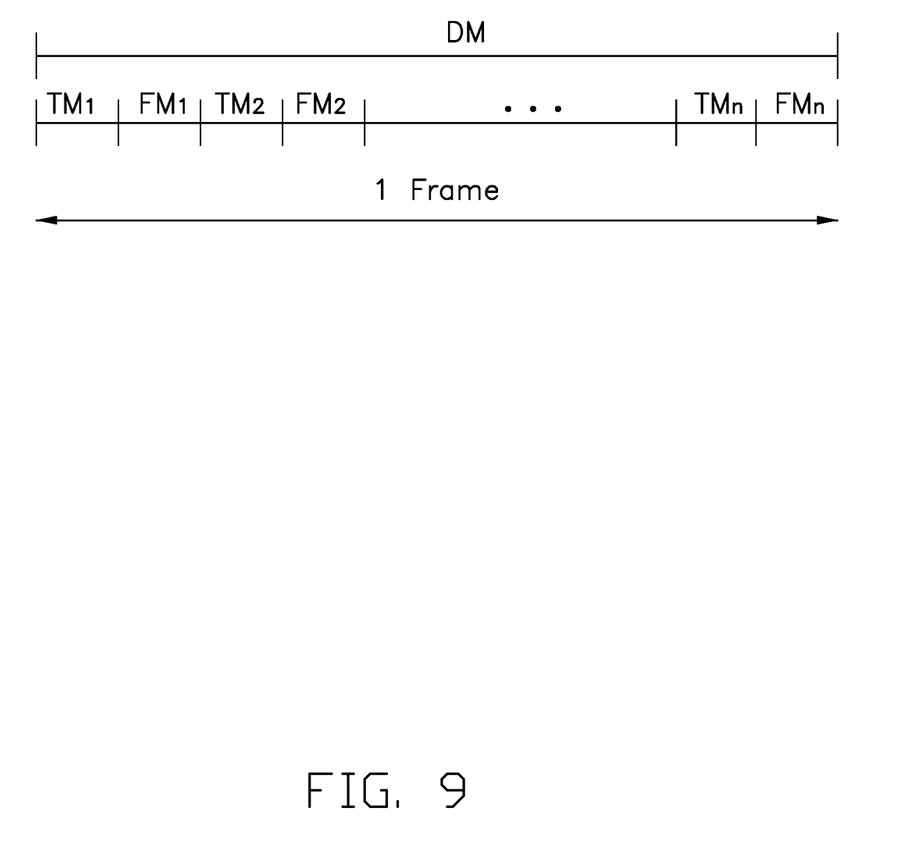

FIG. 8 and FIG. 9 show two different driving time sequences of the touch display device 100. The touch display device 100 is driven by a time division driving method.

Since the display module 110 and the sensing module 130 do not share any electrodes, the driving circuit (not explicitly shown) of the touch display device may simultaneously drive the touch display device to display and to sense in each frame.

As shown in FIG. 8, one frame of sensing time, or a single sensing frame, is divided into a touch sensing period (TM) and a touch force sensing period (FM). The driving circuit of the touch display device alternately drives the touch display device to detect touch position during the TM and to detect touch force during the FM in one frame time.

As shown in FIG. 9, one frame of sensing time, or a single sensing frame, is divided into a plurality of touch sensing sub-periods ($TM_1$ through $TM_n$) and a plurality of touch force sensing sub-periods ($FM_1$ through $FM_n$). The touch sensing sub-periods ($TM_1$ through $TM_n$) and the touch force sensing sub-periods ($FM_1$ through $FM_n$) are alternating. The driving circuit of the touch display device alternately drives the touch display device to detect touch position during each touch sensing sub-period and to detect touch force during each touch force sensing sub-period in one frame time.

During the touch sensing period or the touch sensing sub-period, the first electrode layer 131 may be floating; each second electrodes 1321 may be applied with a driving voltage.

During the touch force sensing period or the touch force sensing sub-period, the first electrode layer 131 may be electrically grounded or applied with a constant voltage; each second electrodes 1321 may be applied with a driving voltage.

It is to be understood, even though information and advantages of the present exemplary embodiments have been set forth in the foregoing description, together with details of the structures and functions of the present exemplary embodiments, the disclosure is illustrative only. Changes may be made in detail, especially in matters of shape, size, and arrangement of parts within the principles of the present exemplary embodiments to the full extent indicated by the plain meaning of the terms in which the appended claims are expressed.

What is claimed is:

1. A touch display device comprising:
   a display module;
   a sensing module on the display module, the sensing module comprising:
   a first electrode layer on the display module;
   a second electrode layer facing the first electrode layer; and
   a dielectric layer between the first electrode layer and the second electrode layer;
   wherein the second electrode layer comprises a plurality of electrodes; the plurality of electrodes functions as electrodes of the touch display device for sensing a touch position; the plurality of electrodes, the first electrode layer, and the dielectric layer cooperatively form capacitors for sensing a touch force;
   wherein the plurality of electrodes are spaced apart from each other and arranged in a matrix of rows and columns; each row of the electrodes is arranged along an X axis direction; and each column of the electrodes is arranged along a Y axis direction;
   wherein each of the plurality of electrodes is electrically coupled to a trace; the trace is connected to a corner of one of the plurality of electrodes; the electrodes in each column of the electrodes have area sizes gradually decrease along the Y axis direction; the traces of the plurality of electrodes are parallel to each other.

2. The touch display device of claim 1, wherein the traces of each column of the electrodes are at a same side of the column of the electrodes.

3. The touch display device of claim 1, wherein two traces of every two adjacent electrodes in each column of the electrodes are at opposite sides of the column of the electrodes.

4. The touch display device of claim 1, wherein the dielectric layer is deformable and transparent.

5. The touch display device of claim 1, wherein each of the plurality of electrodes is made of a transparent conductive material.

6. The touch display device of claim 1, wherein the first electrode layer is a metal mesh.

7. The touch display device of claim 1, wherein the first electrode layer is made of a transparent conductive material.

8. The touch display device of claim 7, wherein the first electrode layer includes a plurality of first electrodes spaced apart from each other; each of the plurality of first electrodes extends as a strip along a same direction.

9. The touch display device of claim 1, wherein the display module is a liquid crystal module; the display module comprises a thin film transistor (TFT) substrate, a color filter substrate facing the TFT substrate, and a liquid crystal layer between the TFT substrate and the color filter substrate; the first electrode layer is formed on the color filter substrate.

10. The touch display device of claim 1, wherein the touch display panel further comprises a first polarizer and a second polarizer; the first polarizer is on a side of the sensing module away from the display module, and the second polarizer is on a side of the display module away from the sensing module.

* * * * *